INVENTOR.
ROBERT G. WAGONER
BY Robert K. Youtie
ATTORNEY

INVENTOR.
ROBERT G. WAGONER
BY Robert K. Youtie
ATTORNEY

Aug. 16, 1966     R. G. WAGONER     3,266,862
PROJECTOR SYNCHRONIZER
Filed Feb. 25, 1964     3 Sheets-Sheet 3
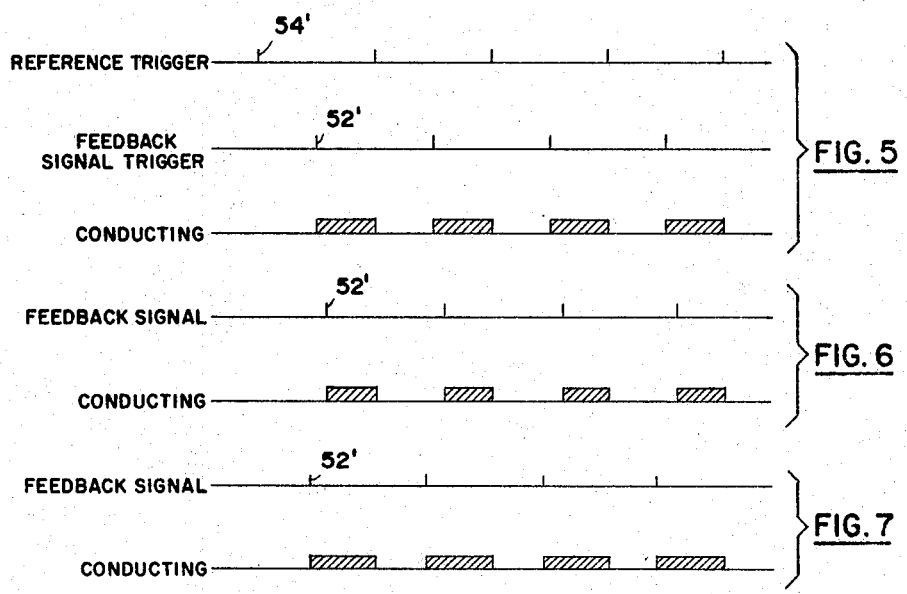
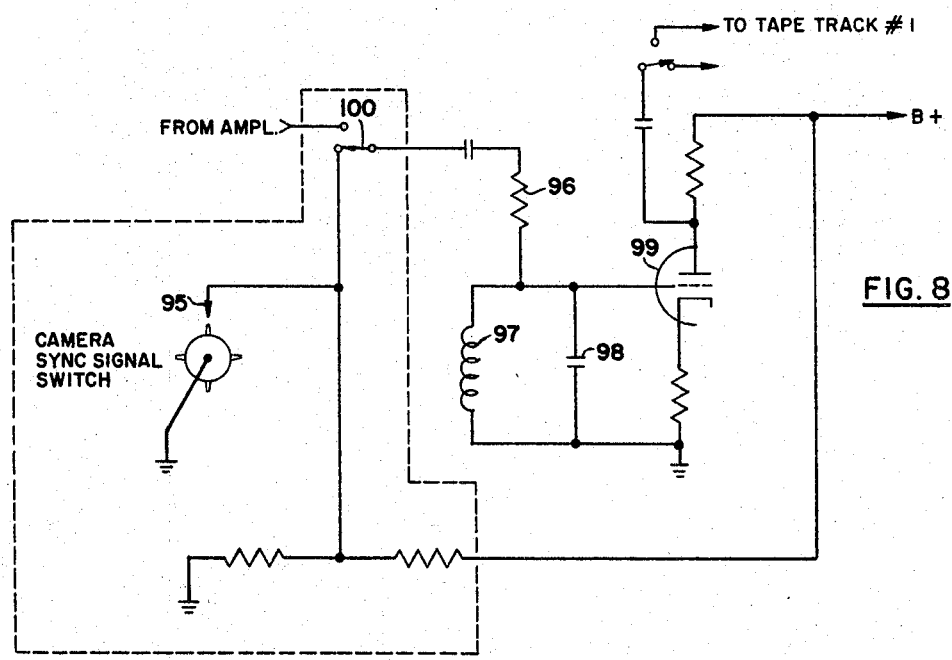
*INVENTOR.*
ROBERT G. WAGONER
BY *Robert K. Youtie*
ATTORNEY

United States Patent Office 3,266,862
Patented August 16, 1966

---

3,266,862
PROJECTOR SYNCHRONIZER
Robert G. Wagoner, R.R. 2, Box 108, Taunton Lake, Marlton, N.J.
Filed Feb. 25, 1964, Ser. No. 347,220
8 Claims. (Cl. 352—12)

This invention relates to synchronization of movie projection and sound reproduction, and embraces unique apparatus for synchronizing a variable-speed motor with sound reproduction.

It is an object of the present invention to provide apparatus for producing synchronized motion-picture projection and sound reproduction, which apparatus is relatively simple and inexpensive, easily operated and highly reliable to produce accurate picture-and-sound synchronization.

It is a further object of the present invention to provide a unique apparatus for synchronizing motion-picture projection with sound reproduction, wherein the quality of sound reproduction is greatly enhanced over present conventional methods, being limited only by the limitations of the sound system employed.

The apparatus of the present invention further contemplates the synchronized movie projection and sound reproduction, wherein the sound track may be repeatedly edited, as desired, without wear and tear on the picture film.

Still a further object of the present invention resides in the provision of a unique apparatus for method for synchronizing motion-picture projection and sound reproduction which may be employed in reproducing sound both of the commentary type and also that of lip synchronization.

The instant invention further contemplates the provision of a unique means for synchronizing a rheostat-controlled motor system with a reference signal.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings, FIGURES 1, 2 and 3 are schematic representations of apparatus employed in successive method steps of the instant invention;

FIGURES 5, 6 and 7 are diagrammatic representations illustrating operation of the circuit of FIGURE 4 under different conditions of timing; and FIGURE 8 is a schematic representation of a slightly modified synchronizing apparatus of the present invention.

Figure 1:
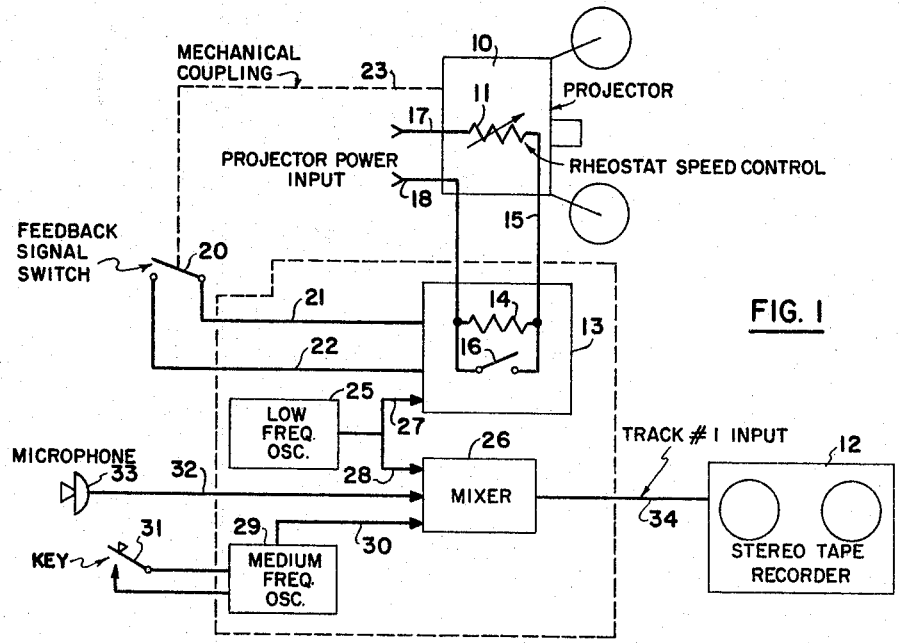

Referring now more particularly to the drawings, and particularly to FIGURE 1 thereof, there is illustrated therein a motion-picture projector 10 having a rheostat speed control 11, while a plural-track or stereo tape recorder is shown at 12. Connected in circuit with the speed control 11 is a relay-type servo synchronizing means 13. The sychronizing means 13 includes a resistance 14 connected in series with the rheostat speed control 11 by a conductor 15, and a relay switch 16 connected across the resistance 14 to shunt and effectively remove the latter from the circuit when the relay switch is closed. The parallel-connected resistance 14 and switch 16 are thus connected in series with speed control 11, and together connected to a power source by supply lines 17 and 18.

In addition, a feedback-signal switch 20 is connected by conductors 21 and 22 to the synchronizing means or servo 13. The feedback-signal switch 20 is mechanically coupled, as represented at 23, to the projector 10 so as to open and close at a speed or frequency proportional to the speed of projector operation. Thus, the frequency of signal produced by switch 20 corresponds to the speed of film being handled by the projector.

A low-frequency oscillator 25 may be employed to produce a reference-frequency signal which is fed both to the synchronizing means 13 and a mixer 26. Connected between the reference-frequency signal source or oscillator 25 and each of the synchronizing means 13 and mixer 26 are respective conductors 27 and 28.

A medium-frequency oscillator 29 may be connected by a conductor 30 to the mixer 26, and is provided with a key or switch 31 for selective production of a timing signal to be fed to the mixer. Also connected to the mixer 26, as by a conductor 32, may be a microphone 33 or other audio-signal input for feeding initial intelligence to the mixer. From the mixer 26 a feed line 34 is connected to the input of one track of recorder 12. Thus, there may be recorded on one tape track (hereinafter referred to as track #1) the reference signal from source 25, a timing signal from source 29, and initial intelligence from source 33.

In practice, the reference-signal source 25 may have a frequency equal to four times the nominal projected frames per second, and the frequency of feedback signal from switch 20 may be equal to four times the actual projected frames per second. The oscillator 29 may have a frequency of about 1000 cycles per second.

In the initial method step of FIGURE 1 the speed of projector 10 is synchronized with respect to the reference signal from source 25. Toward this end, both the reference signal from source 25 and the feedback signal from switch 20 are applied to the servo 13. The setting of speed control 11 is somewhat higher than for nominal projection speed as resistance 14 is switched in and out to control the projector speed. For example, if the projector is running slow, the switch 16 will be closed for a greater proportion of the synchronizing cycle to shunt out resistance 14 and increase the projector speed. Conversely, if the projector is running fast, resistance 14 will be in the circuit for a greater proportion of the synchronizing cycle.

While the film-handling mechanism of projector 10 is projecting a film to be synchronized, the reference-signal source 25 is controlling projector speed and being recorded on track #1 of the recorder 12. During this procedure and at appropriate times corresponding to different film sequences, the timing key or switch 31 may be closed to record a timing signal also on track #1 of recorder 12; and, initial intelligence, such as brief identification of film sequences may be fed from microphone 33 and recorded on track #1. If desired, the film strip may be marked for starting at a proper location.

Figure 2:
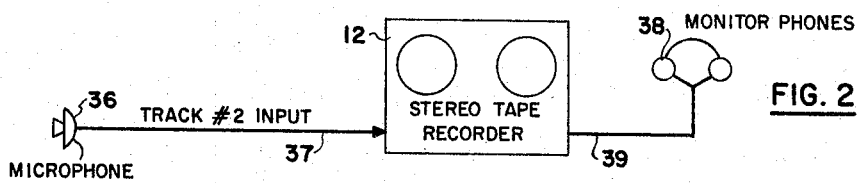

The apparatus shown in FIGURE 2 includes the recorder 12, and audio input or microphone 36 connected by a conductor 37 to the input of another track of the recorder, say track #2. The microphone 36 may, of course, be the same as microphone 33, if desired. In addition, audio-output means, such as monitor phones 38 are connected by a conductor 39 to the output of track #1.

In utilizing the apparatus of FIGURE 2, the tape previously recorded with the apparatus of FIGURE 1 is replayed and the initial intelligence and timing signals of track #1 are monitored on phones 38 by an operator. In accordance with the information monitored, the operator records the desired final intelligence on track #2 through audio input 36.

Figure 3:
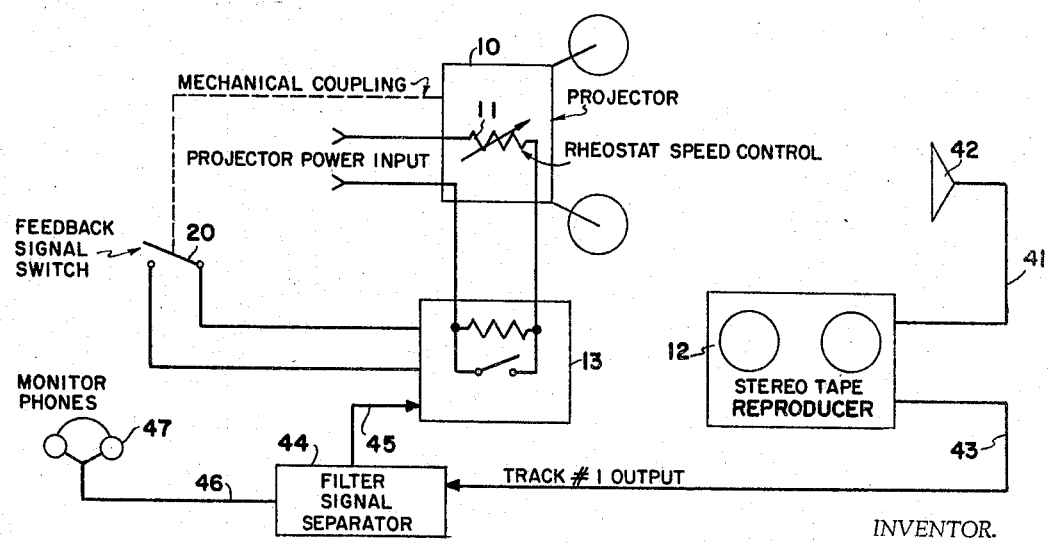

The apparatus illustrated in FIGURE 3 is that of the final step, namely playing back of sound in synchronism with the handling of film. Illustrated therein is the projector 10 having its variable-rheostat speed control 11 and feedback signal switch 20 connected to the servo or synchronizing means 13. The recorder 12 has track 2 output connected by conductor 41 with an audio output or speaker 42, and has track 1 output connected by conductor 43 with a signal separator or filter 44. The filter passes the previously recorded reference signal through conductor 45 to the servo synchronizing means 13, while the medium-frequency timing signals are passed through conductor 46 to audio-output means or monitor phones 47.

In practice the film may be threaded through the projector 10 and properly located therein by the previously mentioned film marking. The recorder is then started and the operator monitors for the medium-frequency timing signal which indicates time to start the projector. The film projection and sound reproduction by audio output 42 then proceed concurrently and are maintained in synchronism by operation of the servo synchronizing means 13 effectively comparing the feedback signal from switch 20 with the reference signal from track 1 and operating the speed control 11 corresponding to the compared signals.

Figure 4:
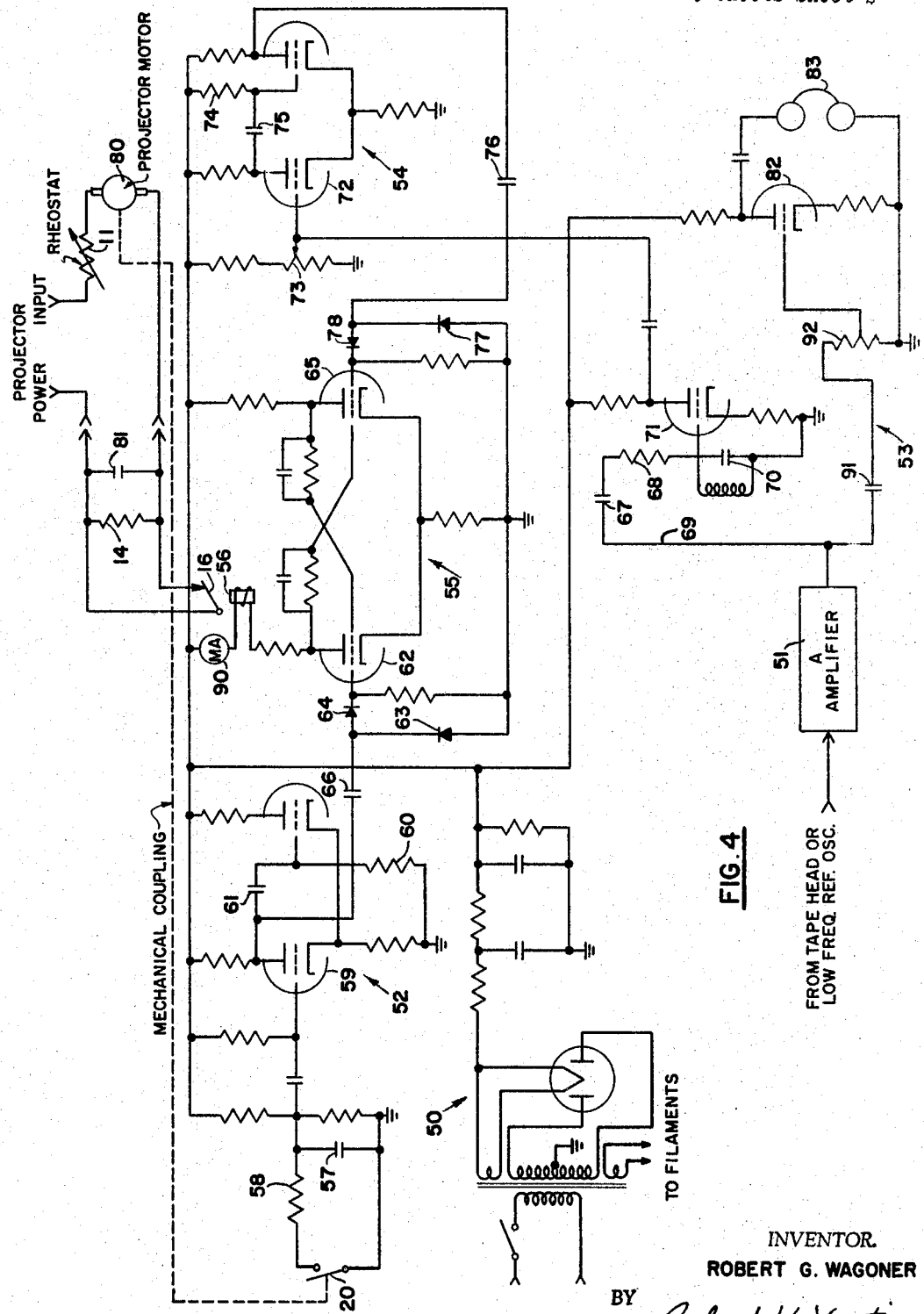
FIGURE 4 is a schematic representation of a synchronizing means constructed in accordance with the teachings of the present invention.

Referring now to the synchronizer servo circuit shown in FIGURE 4, the circuit includes a power supply 50, an audio amplifier 51 receiving a reference signal, the feedback-signal switch 20 and associated trigger circuit 52, a filter and amplifier circuit 53 connected to the output of amplifier 51 and to the input of an additional trigger circuit 54. The trigger circuits 52 and 54 are connected to respective grids of a flip-flop circuit 55, one plate of which is connected to a relay coil 56 for operating the relay switch 16.

Considering first the left-hand side of flip-flop circuit 55, which is controlled by the signal of feedback switch 20. Capacitance 57 charges up through resistance 58, and the feedback-signal switch 20 discharges the capacitance (resistance 58 reducing sparking), to produce a negative step which is applied to the trigger tube 59. The time constant of resistance 60, capacitance 61 connected to the plate of trigger tube 59 is of sufficient length so that extraneous negative steps caused by bounce of switch 20 do not produce multiple triggering of tube 59. The positive trigger from tube 59 is differentiated through capacitance 66 and applied to the grid of flip-flop tube 62. Diode 63 clamps the negative overshoot of the trigger to ground, and diode 64 allows only the positive part of the trigger to reach flip-flop triode 62. Tube 62 will then conduct, and by flip-flop action shut off the other flip-flop triode 65. The relay 56, being connected to the plate of triode 62, will open and place resistance 14 in series with rheostat 11.

The other flip-flop triode 65 is controlled from the amplifier 51. The reference signal, as from track 1 of the recorder 12 or from the low-frequency oscillator 25, is applied to the amplifier 51 and the output thereof is fed through capacitance 67 to a filter, such as composed of resistance 68, inductance 69 and capacitance 70. This filter 68, 69 and 70 has a peak response at the frequency of the reference signal, and its output is fed to amplifier tube 71. The amplified reference signal is fed from the output of tube 71 to tube 72 of trigger circuit 54. Variable resistance 73 determines the trigger level of tube 72. That is, the positive-going portion of the reference sine wave will cause tube 72 to conduct at a level dependent upon the setting of resistance 73. The time constant of resistance 74 and capacitance 75 is sufficiently long to prevent multiple triggering of tube 72. The positive trigger from tube 72 is differentiated through capacitance 76 and applied to the grid of right-hand flip-flop triode 65. The operation of diodes 77 and 78 is similar to that previously described in connection with diodes 63 and 64.

Upon triggering of triode 65 the plate thereof conducts and shuts off triode 62 to deenergize relay 56 and close the contacts of switch 16. The relay switch will thus be alternately opened and closed upon operation of the flip-flop circuit 55 and the resistance 14 will be in circuit with the projector motor 80 for a longer or shorter percentage of time depending upon the relative positions of the timing triggers representing the reference and feedback signals. A capacitance 81 may be connected in parallel with the resistance 14 to reduce arcing at the contacts of switch 16.

In addition, a monitor amplifier tube 82 may be connected to the output of amplifier 51 and have associated therewith monitor phones 83.

Referring now to the timing diagram of FIGURE 5, there is illustrated the timing relation of reference impulses 54' of the reference trigger circuit 54 and feedback-signal impulse 52' of the feedback trigger circuit 52 in a synchronized relation. The periods of conduction and nonconduction of flip-flop tube 62 are thus substantially equal, as are the periods of relay switch 16 being open and closed. Viewed otherwise, the flip-flop tubes 62 and 65 each conduct for 50% of the time, and resistance 14 is in circuit with the motor 80 for 50% of the time.

In FIGURE 6 is illustrated the condition of the projector running slow. The frequency of signals from switch 20 is therefore less than that of the reference signal. In this condition triode 62 conducts less than 50% of the time, as illustrated in FIGURE 6, so that resistance 14 is in circuit with the motor 80 less than 50% of the time. The motor speed thus is increased by reason of the reduced effective series resistance in the motor circuit.

Conversely, as seen in FIGURE 7, when the speed of motor 80 is too great the frequency of feedback signals from switch 20 is greater than that of the reference signal. This causes flip-flop triode 62 to conduct more than 50% of the time and thereby reduce the speed of motor 80.

A meter 90 may be connected in series with the relay 56 and employed to monitor the setting of rheostat 11. For example if the meter reads full scale when tube 62 is conducting (static operation), the rheostat can be set for the meter to read half-scale at nominal speed. That is, the rheostat 11 is normally set for a projector motor speed slightly higher than required, and the relay servo synchronizing means 13 will adjust the projector motor to proper speed. As the plate current consists of rectangular pulses of widths depending on the relative positions of the reference and feedback signals, the meter gives an average reading which is an indication of the offset of the signals from a normal condition where the plate-current pulses are symmetrical square waves.

Connected between the amplifier 51 and monitor amplifier tube 82 may be a capacitance 91 and variable resistance 92 having a time constant which attenuates the low frequencies. This permits the voice comments and medium-frequency timing signal to be heard in the monitor phones 83 after being amplified by tube 82 when the reference signal comes from the tape.

It is appreciated that the frequency of the feedback signal may be other than four times the projected frames, and this could be suitably compensated for, as by adjustment of resistance 73. The frequency ratio of one to one should be maintained at the grids of the tubes 62 and 65. Also, the servo circuitry may be transistorized in part or in whole, if desired.

In the modification of FIGURE 8 is shown apparatus wherein the reference signal may be derived from the film-handling mechanism, rather than from an independent source. For example, the film-handling mechanism may be a movie camera and provide a reference signal concurrently with sound recording.

Such a reference signal may be generated by a signal switch 95 mechanically coupled to a motion-picture camera to produce a frequency of four times the frames per second. The signal is passed through a filter including resistance 96, inductance 97 and capacitance 98 to an amplifier tube 99, which corresponds generally to the tube 71 of FIGURE 4.

During operation of the camera, switch 100 is in the position shown and causes a negative step or voltage to appear at the input of filter 96–98. Any extraneous trigger signals will be filtered out and a sine wave will be produced at the grid of amplifier tube 99, which signal is amplified and recorded on track #1 of tape recorder 12 for use as described hereinbefore. Simultaneously, the final intelligence may be recorded on track #2 of the recorder 12.

From the foregoing, it is seen that the present invention provides a synchronizing apparatus particularly adapted for synchronizing motion-picture projection and sound reproduction, which fully accomplishes its intended object and is well adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. Apparatus for synchronizing motion-picture projection and sound reproduction, said apparatus comprising a movie projector adapted to produce a feedback signal corresponding to film speed, speed-control means associated with said projector, synchronizing means connected to said speed-control means for operating the latter, a plural-track tape recorder-reproducer having one track connected to said synchronizing means for feeding a reference signal to the latter, feed means connected between said projector and synchronizing means for feeding said feedback signal to the synchronizing means, said synchronizing means operating said speed-control means responsive to comparison of feedback and reference signals, and audio-output means connected to the other track of said recorder for reproducing sound from the latter, whereby motion-picture projection by said projector is synchronized with sound reproduced by said audio output, said speed-control means comprising a rheostat, and said synchronizing means comprising a resistance in series with said rheostat, and a relay switch in parallel with said resistance to shunt the latter responsive to said comparison.

2. Apparatus according to claim 1, in combination with an independent reference-signal source adapted for connection to said one recorder-reproducer track and synchronizing means and to simultaneously record on said one recorder-reproducer track and synchronize said movie projector.

3. Apparatus according to claim 2, in combination with an independent timing-signal source adapted for connection to said one recorder track, and switch means connected to said timing-signal source for selectively recording a timing signal on said one track.

4. Apparatus for producing a sound tape for synchronous reproduction with motion-picture-film projections, said apparatus comprising a movie projector adapted to produce a feedback signal corresponding to film speed, speed-control means associated with said projector, resistance connected in series with said speed-control means, a synchronizing switch connected in parallel with said resistance, a plural-track tape recorder-reproducer, a reference-signal source connected to one track of said recorder-reproducer for recording thereon and to said synchronizing relay switch for synchronization of movie projection with a reference signal, and audio-input means connected to the other recorder track to record final intelligence thereon, whereby said projector is adapted to be synchronized with said recorder-reproducer by feeding the recorded reference signal to said synchronizing relay switch in the absence of said source for synchronized movie projection and sound reproduction of said other track.

5. Apparatus according to claim 4, in combination with audio-input means connected to said one track to record initial intelligence simultaneously with said reference signal, and output means connected to said one track for monitoring while recording final intelligence on said other track.

6. Synchronizing means for synchronizing a motor with a reference signal, comprising an electrical load connected to said motor, a switch in parallel with said load to shunt the latter upon closure, relay means connected to operate said switch, feedback-signal producing means having a frequency corresponding to motor speed, feedback-signal trigger means connected to said feedback-signal producing means to be triggered by the latter, reference-signal producing means, reference-signal trigger means connected to said reference-signal producing means to be triggered by the latter, and flip-flop means having its grids respectively connected to said feedback- and reference-signal trigger means and having a plate connected to said relay means, whereby said relay is successively energized and deenergized to maintain said load in circuit with said motor corresponding to the frequency difference between said feedback and reference signals.

7. Synchronizing means according to claim 6, said feedback-signal producing means comprising a switch mechanism connected to said motor.

8. Apparatus for producing a sound tape for synchronous reproduction with a motion-picture-film projection, said apparatus comprising a movie projector adapted to produce a feedback signal corresponding to film speed, speed-control means associated with said projector, resistance connected in series with said speed-control means, a plural-track tape recorder-reproducer, a reference-signal source connected to one track of said recorder-reproducer for recording thereon, audio-input means connected to the other recorder-reproducer track to record final intelligence thereon, a switch in parallel with said resistance to shunt the latter upon closing, relay means connected to operate said switch, feedback-signal trigger means connected to receive said feedback signals and be triggered by the latter, reference-signal trigger means connected to receive said reference signals and be triggered by the latter, and flip-flop means having its grids respectively connected to said feedback- and reference-signal trigger means and having a plate connected to said relay means, whereby said relay means is successively energized and deenergized to maintain said resistance in circuit with said speed-control means corresponding to the frequency difference between said feedback and reference signals.

References Cited by the Examiner

UNITED STATES PATENTS

| | | | |
|---|---|---|---|
| 2,055,261 | 9/1936 | Oswald et al. | 352—5 |
| 2,354,583 | 7/1944 | Eddy | 352—16 |
| 2,475,439 | 7/1949 | Waller et al. | 352—17 |
| 2,606,476 | 8/1952 | Waller et al. | 352—17 |
| 2,679,187 | 5/1954 | Bitting | 352—17 |
| 2,797,611 | 7/1957 | Anthony | 352—17 |

FOREIGN PATENTS

| | | |
|---|---|---|
| 342,345 | 1/1931 | Great Britain. |
| 770,372 | 3/1957 | Great Britain. |
| 856,778 | 12/1960 | Great Britain. |

NORTON ANSHER, *Primary Examiner.*

WILLIAM MISIEK, *Assistant Examiner.*